(12) United States Patent
Chang et al.

(10) Patent No.: US 8,358,441 B2
(45) Date of Patent: Jan. 22, 2013

(54) METHODS AND SYSTEMS FOR SAMPLING AND MODELING OF COLORANT-LIMITED, MULTI-COLORANT COLOR SPACES

(75) Inventors: James Zhixin Chang, Vancouver, WA (US); Chizu Watanabe, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 966 days.

(21) Appl. No.: 12/416,590

(22) Filed: Apr. 1, 2009

(65) Prior Publication Data

US 2010/0253698 A1   Oct. 7, 2010

(51) Int. Cl.
*H04N 1/40* (2006.01)

(52) U.S. Cl. .................................. 358/2.1; 358/1.16

(58) Field of Classification Search .............. 358/1.9, 358/2.1, 500, 504, 1.16, 515–523, 527, 530
See application file for complete search history.

(56) References Cited

U.S. PATENT DOCUMENTS

| | | | |
|---|---|---|---|
| 4,941,038 A | 7/1990 | Walowit |
| 5,243,414 A | 9/1993 | Dalrymple et al. |
| 5,426,517 A | 6/1995 | Schwartz |
| 5,450,216 A | 9/1995 | Kasson |
| 5,491,568 A | 2/1996 | Wan et al. |
| 5,515,172 A | 5/1996 | Shiau |
| 5,633,662 A | 5/1997 | Allen |
| 5,731,818 A | 3/1998 | Wan et al. |
| 5,933,253 A | 8/1999 | Ito et al. |
| 5,933,256 A | 8/1999 | Ebner |
| 5,949,967 A | 9/1999 | Spaulding et al. |
| 5,953,499 A | 9/1999 | Narendranath |
| 5,975,679 A | 11/1999 | Nicoloff, Jr. |
| 6,002,806 A | 12/1999 | Morikawa |
| 6,084,689 A | 7/2000 | Mo |
| 6,229,915 B1 | 5/2001 | Ohkubo |
| 6,262,744 B1 | 7/2001 | Carrein |
| 6,282,311 B1 | 8/2001 | McCarthy et al. |
| 6,282,313 B1 | 8/2001 | McCarthy et al. |
| 6,342,951 B1 | 1/2002 | Eschbach et al. |
| 6,349,146 B2 | 2/2002 | Roetling |
| 6,373,595 B1 | 4/2002 | Semba et al. |
| 6,384,836 B1 | 5/2002 | Naylor, Jr. et al. |
| 6,407,825 B1 | 6/2002 | Couwenhoven |
| 6,547,358 B1 | 4/2003 | Tanaka |

(Continued)

FOREIGN PATENT DOCUMENTS

EP   0626781   11/1994

(Continued)

OTHER PUBLICATIONS

Development and Testing of a Color Space (IPT) with Improved Hue Uniformity by Fritz Ebner & Mark Fairchild, Rochester Institute of Technology.

(Continued)

*Primary Examiner* — Thomas D Lee
*Assistant Examiner* — Stephen M Brinich
(74) *Attorney, Agent, or Firm* — Chernoff Vilhauer McClung & Stenzel, LLP (57) ABSTRACT

Aspects of the present invention relate to methods and systems for determining output responses and device targets for multi-colorant output devices. Some aspects relate to methods and systems for multi-dimensional rectilinear sampling, transformation of samples from an unlimited colorant space to a colorant-limited space, obtaining additional samples within a colorant-limitation hyperplane and interpolation of values in a colorant-limited space.

16 Claims, 9 Drawing Sheets

U.S. PATENT DOCUMENTS

| | | |
|---|---|---|
| 6,560,356 B1 | 5/2003 | Takahashi et al. |
| 7,190,485 B2 | 3/2007 | Couwenhoven |
| 2001/0040998 A1 | 11/2001 | Roetling |
| 2002/0041709 A1 | 4/2002 | Gonsalves |
| 2003/0001851 A1 | 1/2003 | Bushey |
| 2003/0012427 A1 | 1/2003 | Martinez-Uriegas et al. |
| 2003/0067615 A1 | 4/2003 | Kawakami et al. |
| 2003/0072016 A1 | 4/2003 | Dalrymple et al. |
| 2003/0117457 A1 | 6/2003 | Qiao |
| 2003/0160801 A1 | 8/2003 | Butler |
| 2005/0030559 A1 | 2/2005 | Jacob |
| 2005/0073730 A1 | 4/2005 | Huang et al. |
| 2005/0219574 A1 | 10/2005 | Ok |
| 2005/0248581 A1 | 11/2005 | Choe |
| 2005/0248784 A1 | 11/2005 | Henley et al. |
| 2006/0012811 A1 | 1/2006 | Dalrymple |
| 2007/0070468 A1 | 3/2007 | Ogawa |
| 2007/0195340 A1 | 8/2007 | Yao |
| 2007/0195341 A1 | 8/2007 | Yao |
| 2007/0247647 A1 | 10/2007 | Pettigrew |

FOREIGN PATENT DOCUMENTS

| | | |
|---|---|---|
| EP | 635971 | 1/1995 |
| EP | 720352 | 7/1996 |
| EP | 730969 | 9/1996 |
| EP | 887999 | 12/1998 |
| EP | 1289268 | 3/2003 |
| EP | 1267565 | 11/2003 |
| EP | 1533994 | 5/2005 |
| EP | 1770984 | 4/2007 |
| EP | 1781014 | 5/2007 |
| JP | 2000253264 | 9/2000 |
| JP | 2005035012 | 2/2005 |
| WO | WO96/10239 | 4/1996 |
| WO | WO97/01831 | 1/1997 |
| WO | WO99/46125 | 12/1999 |
| WO | WO01/17233 | 3/2001 |
| WO | WO2005043507 | 5/2005 |

OTHER PUBLICATIONS

Macdonald, Assessing the Effects of Gamut Compression in the Reproduction of Fine Art Paintings, Proc of the IS&T/SID 1995 Color Imaging Conference: Color Science, Systems and Applications, pp. 194-199.

U.S. Appl. No. 11/053,370—Office Action dated Apr. 24, 2008.

U.S. Appl. No. 11/053,370—Office Action dated Dec. 12, 2008.

Translation of co-pending Japanese Office Action, dated Oct. 18, 2011, Japanese Patent App. No. 2010-070515, filed Mar. 25, 2010 (Pub. No. 2010-246104, published Oct. 28, 2010) Sharp Corp., 3 pgs.

Official Notification in co-pending Japanese Patent App. No. 2010-070515, filed Mar. 25, 2010 (Pub. No. 2010-246104, published Oct. 28, 2010) Sharp Corp., 2 pgs.

Office Action, Japanese Patent App. No. 2002-081312, filed Mar. 22, 2002 (Pub. No. 2003-283856, published Mar. 10, 2003) Seiko Epson Corp., 24 pgs.

Amendment, Japanese Patent App. No. 2002-081312, filed Mar. 22, 2002 (Pub. No. 2003-283856, published Mar. 10, 2003) Seiko Epson Corp., 26 pgs.

Office Action, Japanese Patent App. No. 2002-224164, filed Jul. 31, 2002 (Pub. No. 2004-058624, published Feb. 26, 2004) Canon Inc., 23 pgs.

Amendment, Japanese Patent App. No. 2002-224164, filed Jul. 31, 2002 (Pub. No. 2004-058624, published Feb. 26, 2004) Canon Inc., 4 pgs.

METHODS AND SYSTEMS FOR SAMPLING AND MODELING OF COLORANT-LIMITED, MULTI-COLORANT COLOR SPACES

FIELD OF THE INVENTION

Aspects of the present invention relate to methods and systems for determining output responses and device targets for multi-colorant output devices. Some aspects relate to methods and systems for multi-dimensional rectilinear sampling, transformation of samples from an unlimited colorant space to a colorant-limited space, obtaining additional samples within a colorant-limitation hyperplane and interpolation of values in a colorant-limited space.

BACKGROUND

Printing device technology faces the problem of sampling and modeling a colorant-limited multi-colorant signal space. For example, in halftone offset printing processes, there is often a total area coverage limit (TAC limit), e.g., 280%, for colorants to be applied. Such limits may be media type dependent. Similar limits often apply to inkjet, electro-photographic and other color printing processes. In this example, any CMYK combinations where C+M+Y+K exceeds 280% will over-ink the paper and might cause mechanical, image quality, or drying problems—depending on the particular printing process. The problem arises in converting colorant values from a non-limited color space to a colorant-limited color space.

SUMMARY

Some embodiments of the present invention comprise methods and systems for determining output responses and device targets for multi-colorant output devices. Some aspects relate to methods and systems for multi-dimensional rectilinear sampling, transformation of samples from an unlimited colorant space to a colorant-limited space, obtaining additional samples within a colorant-limitation hyperplane and interpolation of values in a colorant-limited space.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

A conventional method for sampling and modeling a multi-colorant signal space without the colorant-limit constraint is by rectilinear sampling of the hypercube representing the signal space. By tessellating the sample points, the signal space hypercube is partitioned into multidimensional simplexes. By measuring the printer output responses (e.g., in the CIELAB space) on the sample points and applying interpolation on the simplexes, a printer model can be created to obtain the output response for any input point in the printer signal space.

The conventional method described above cannot be easily adapted to the colorant-limited printer colorant space since such a space is an irregular polytope after the colorant limitation is applied to the hypercube. This invention provides a method for efficiently sampling and modeling the colorant-limited printer colorant space represented by an irregular polytope.

The most common current solution for performing colorant limitation for printing processes is to do post-processing on the amount of CMYK colorants to reduce the total amount to within the TAC requirement. It can be achieved by either clipping or compression. There are issues associated with either of these methods. The clipping method is not invertible and the compression method doesn't utilize the entire colorant-limited gamut.

In previously-filed, co-pending U.S. patent application Ser. No. 11/692,566, filed on Mar. 28, 2007 and U.S. patent application Ser. No. 10/892,845, filed Jul. 16, 2004 and published as United States Patent Publication Number 2006/0012811

A1 on Jan. 19, 2006, both of which are hereby incorporated herein by reference, one or more of the inventors of the present invention developed methods for constructing a bijective mapping between a colorant-limited polytope representing the actual colorant-limited signal space and a hypercube representing a nominal signal space without colorant limitation. With such a bijective mapping, we can continue to use the conventional rectilinear sampling on the nominal colorant space and the sample points are uniquely mapped to the colorant-limited actual colorant space. The mapped sample points in the actual colorant space can be used to create a colorant-limited printer target to obtain the printer output responses for the sample points. For an input point in the colorant-limited colorant space, it can be mapped to the nominal space and its output response can be obtained by interpolation on the simplexes constructed by the sample points on the nominal hypercube. With this method, we created a way to efficiently sample and interpolate the colorant-limited actual colorant space via the nominal colorant space. However, interpolating on the nominal colorant space, which is a hypercube, is not as accurate as interpolating on the actual colorant-limited colorant space. When the tessellation on the nominal colorant space is mapped back to colorant-limited colorant space, it doesn't completely cover the colorant-limited colorant space represented by a polytope.

Figure 1A:
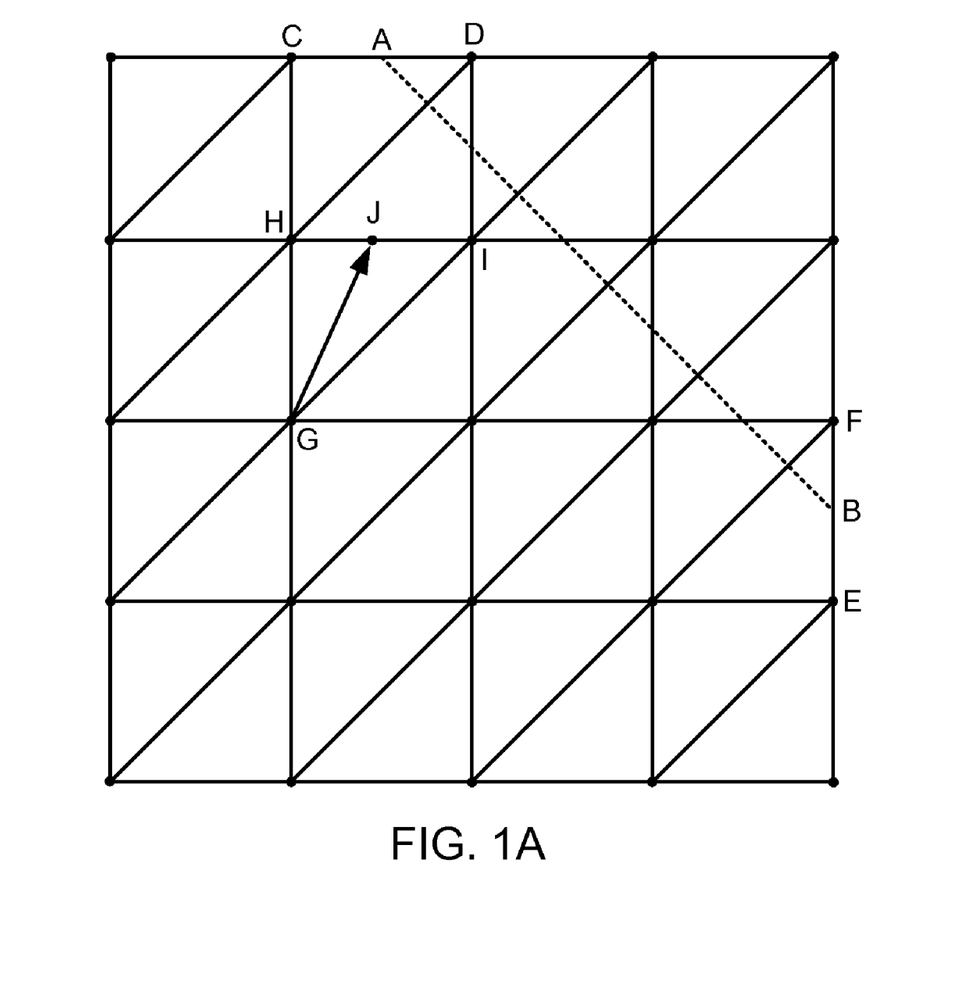
FIG. 1A is a diagram showing a common tessellation of a nominal color space.
Figure 1B:
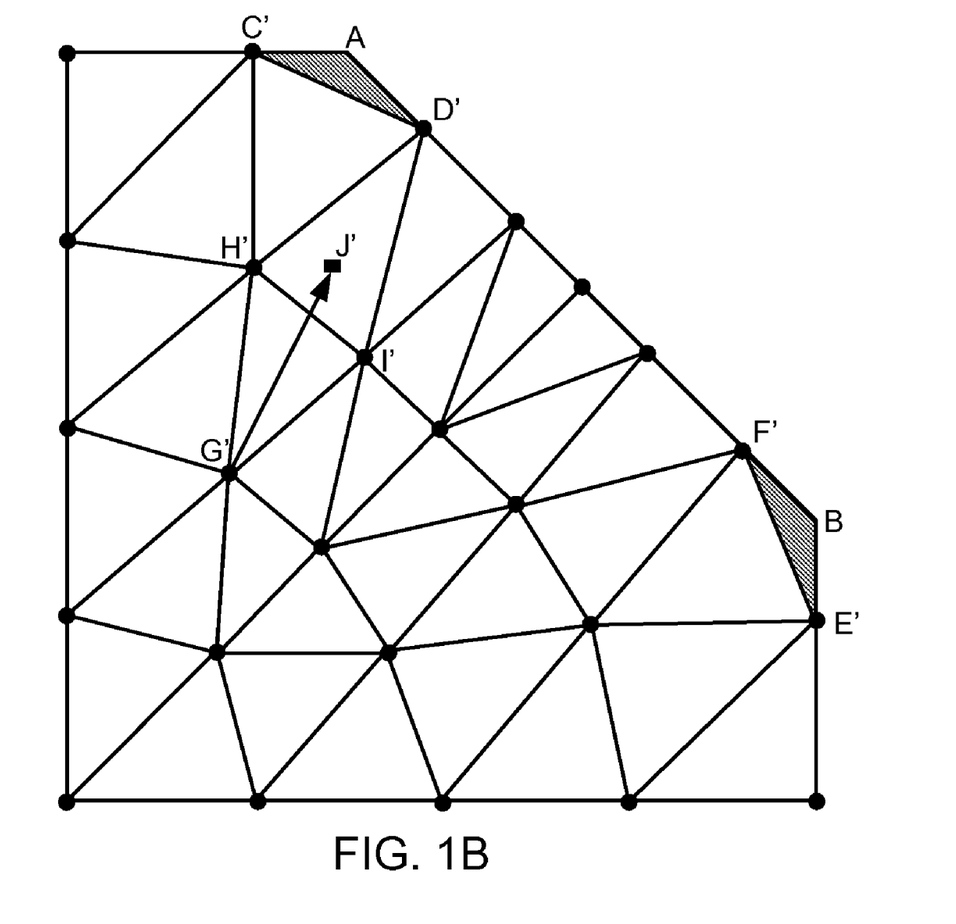
FIG. 1B is a diagram showing the tessellation of a colorant-limited color space that is transformed from the one in FIG. 1A.

The problems are illustrated in FIGS. 1A and 1B using a 2-D tessellation as an example. The nominal space tessellation is shown in FIG. 1A, which is mapped to the tessellation shown in FIG. 1B. Line AB represents the colorant limitation line. As shown in FIG. 1B, the shaded areas, AC'D' and BE'F', are not covered by the mapped tessellation. In FIG. 1A, a point J is within a nominal triangle GHI. As shown in FIG. 1B, it is possible that the mapped point J' is not within the mapped triangle G'H'I'. This contributes to the inaccuracy of using nominal space tessellation for interpolation.

Unlike these previously-described methods, simplicial interpolation is not carried out on the nominal hypercube in embodiments of the present invention. In these embodiments, the simplexes that tessellate the nominal hypercube are mapped back to the actual colorant-limited colorant space and the simplicial interpolation is carried out on the colorant-limited colorant space. Furthermore, additional simplexes are constructed on the colorant-limited colorant space to completely cover the irregular polytope. Some embodiments of the present invention also comprise a technique to obtain the additional sample points required for constructing the additional simplexes.

Embodiments of the present invention improve on the previously-disclosed methods by increasing the accuracy of the simplicial interpolation in a printer model that calculates the printer output response of an input point in the colorant-limited colorant space. This is accomplished by constructing additional simplexes so that the tessellation based on the simplexes will completely cover the colorant-limited colorant space. The other reason for the accuracy improvement is that the interpolation is based on the simplexes on the actual colorant-limited space instead of the nominal space. Some embodiments comprise an efficient technique to carry out the simplicial interpolation on the actual colorant-limited space with the additional simplexes. The interpolation techniques of these embodiments are of the same complexity as those based on the nominal space, which is a hypercube.

Compared with the technique of post-processing the CMYK colorant amounts commonly practiced in the industry, embodiments of the present invention offer a better way to model the colorant-limited multi-colorant signal space. When converting an image into the CMYK space, different CMYK colorant combinations are used for different input colors. In post-processing techniques, a CMYK colorant combination over the colorant limit is mapped back to another CMYK colorant combination within the colorant limit after the color conversion processing. The result is that two different input colors will be converted to the same CMYK colorant combination. With embodiments of the present invention, we can make an accurate model before the color conversion and use it for making color conversion decisions when an input image is converted into printer CMYK values for printing.

An exemplary operating environment for some embodiments is the software color profiling tools used by color hard-copy product developers to create color conversion tables to tune color outputs. There are no special operating system requirements for such software tools; any modern general-purpose computing environment should suffice, but some embodiments may run on special-purpose computing devices as hardware, firmware and/or software as well.

In some embodiments, a component of the software color profiling tools is the printer target generator, which produces a CMYK target file with sample color patches for the tessellation of the colorant-limited CMYK color space. This target will be subsequently printed and measured to obtain the printer output responses on the color patches. Alternatively, the target generator can be directly implemented in a color hard-copy device as firmware to directly produce the CMYK target file as a hard-copy. In this component, some embodiments may enable the creation of colorant-limited color patches based on the rectilinear sampling of the nominal hypercube and the additional color patches required for the tessellation to completely cover the colorant-limited polytope.

In some embodiments, another component of these software color profiling tools creates a printer model that converts an input CMYK into a printer response (e.g., in CIELAB space) based on simplicial interpolation from the measured printer response data for the target color patches. Some embodiments provide an efficient technique to carry out this interpolation.

Exemplary Embodiments

Some embodiments of the present invention can be applied to modeling colorant-limited multi-dimensional colorant spaces of any dimension greater than one (the sampling and modeling of 1-D colorant spaces are trivial). In an exemplary embodiment, we describe our implementation for sampling and modeling a 4-D colorant-limited CMYK colorant space.

In this exemplary embodiment, we create the colorant-limited CMYK target file by converting a standard rectilinear sampling CMYK target without colorant limitation. Two of such well known standards are the IT8.7/3 and IT8.7/4 standards for CMYK printer characterization targets. These standards are described in "Graphic technology—Input data for characterization of 4-color process printing," ANSI IT8.7/3-1993, American National Standards Institute, Inc. and "Graphic technology—Input data for characterization of 4-color process printing—Expanded data set," ANSI IT8.7/4-2005, American National Standards Institute, Inc., which are incorporated herein by reference.

For these two standard CMYK targets, the majority of the sample points are based on rectilinear sampling of the 4-D CMYK hypercube. If there are no colorant limitation constraints, the 4-D tessellation based on the rectilinear sample points can be used to partition the CMYK hypercube into simplexes and 4-D simplicial interpolation can be used to obtain the output printer response for any CMYK combination based on the measured output responses on the sample points. For both of these targets, there are some extra sample points in addition to the rectilinear sample points. For each of these extra sample points, by identifying the simplex that contains it, it can be used to further partition its containing simplex into more simplexes. So the measured printer output responses on these extra sample points can be used to increase the interpolation accuracy via the partition by the finer simplexes.

Alternatively, in some embodiments, we can partition all the samples of a standard target (IT8.7/3 or IT8.7/4) according to the K value. For each K value, the CMY sampling can be decomposed into a rectilinear sampling of the CMY cube and the extra samples. To find the printer output response for an input CMYK combination by interpolation, we can first find the two adjacent K values ($K_i$ and $K_{i+1}$) in the target wherein the input K is located (i.e., $K_i \leq K \leq K_{i+1}$). The CMY output responses at the two K values are first obtained by tetrahedral interpolation based on the measured printer output responses from the CMY samples. Then the CMYK output response is obtained by interpolating the two calculated output responses along the K direction. Our preferred embodiment is based on this alternative method where the CMYK interpolation is decomposed into CMY tetrahedral interpolations followed by interpolation along the K direction.

Interpolation along K Direction with Colorant Limitation

In these embodiments, we first decompose a standard 4-D CMYK target sampling into a collection of 3-D CMY target sampling indexed by K. The total colorant limit is then applied to the CMY sampling based on the K sampling. Given a total 4-D colorant limit, $L_4$, and the K value, the 3-D CMY colorant limit (as a function of K, expressed in percentage) may be obtained by $$L_3(K) = \min(300, L_4-K).$$

The method for sampling and modeling the colorant-limited CMY cube will be presented in the next subsection. Here, we first present the method for doing interpolation along the K direction with total colorant limitation constraints, which is not as straightforward as the interpolation method used where there are no colorant limitations.

Figure 2A:
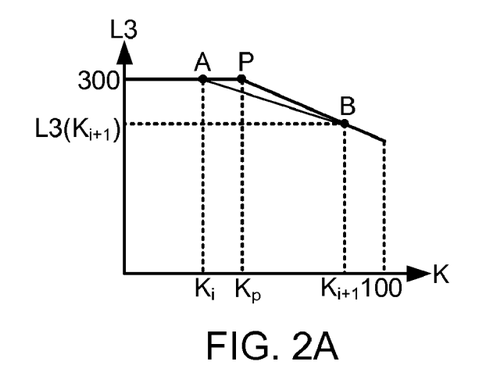
FIG. 2A is a diagram showing an exemplary interpolation scenario for a range of ink limit.
Figure 2B:
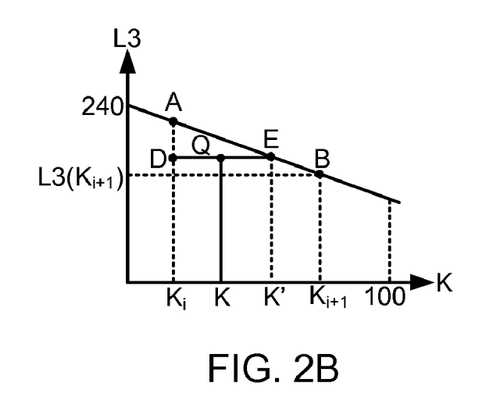
FIG. 2B is a diagram showing an alternative exemplary interpolation scenario for another range of ink limit.
Figure 2C:
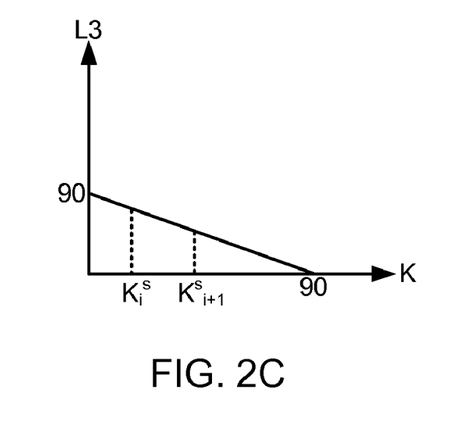
FIG. 2C is a diagram showing another alternative exemplary interpolation scenario for a third range of ink limit.

The relationship between the 3-D CMY colorant limit and the K value is shown in FIGS. 2A-2C for three different ranges of the 4-D total area coverage (TAC). For a colorant-limited CMYK combination where the K value is between two adjacent K sample points, if the sum of CMY is less than or equal to the 3-D CMY limit of the larger K sample ($L_4$ ($K_{i+1}$) in FIGS. 2A and 2B), the output response of the CMYK combination can be obtained by interpolating the CMY output responses at the two K samples along the K direction.

However, as shown in FIG. 2B, for a CMYK combination where the sum of CMY is greater than the 3-D CMY colorant limit for the larger K value (represented by point Q in FIG. 2B), it is not possible to use the straightforward 1-D interpolation along the K direction to obtain the output response since the CMY combination at the larger K value is over the 3-D CMY limit and its response cannot be obtained. In this case, the CMYK output response will be interpolated from the CMY output responses at points D and E, where the output response at point D is the CMY output response at the smaller K sample and the output response at point E is the CMY output response on the 4-D colorant limitation hyperplane of the CMYK space. At point E, the CMY will be the same as the CMY in the input CMYK combination and the new K value may be obtained by $$K' = L_4 - (C+M+Y).$$

In the FIGS. 2A-2C, points A and B represent CMY colorant limit planes for two different K values, respectively. In the next subsection, we will discuss the addition of extra sample points for tessellating the colorant limited CMY space so that the tessellation will completely cover the colorant limited polytope. The tessellation of this augmented set of sample points on the CMY colorant limit plane also completely covers the CMY colorant limit plane since this plane is part of the colorant limited CMY polytope. It can be shown that point E is covered by the tessellation of the augmented sample points for points A and B on the 4-D colorant limited hyperplane. Therefore, the output response at point E can be obtained by simplicial interpolation using the sample points for points A and B. Assuming the printer output response is measured in the CIELAB space, the output CIELAB values at the input point Q can be obtained by $$[L_Q, a_Q, b_Q] = \frac{K - K_i}{K' - K_i}([L_E, a_E, b_E] - [L_D, a_D, b_D]) + [L_D, a_D, b_D].$$

This technique of simplicial interpolation on the 4-D colorant limited hyperplane followed by 1-D interpolation along the K direction discussed above works well for total 4-D colorant limitation between 100 and 300 (FIG. 2B). However, it will not always work for colorant limitation between 300 and 400. As shown in FIG. 2A, if there is a point (P) connecting two piecewise linear line segments between two adjacent K sample points, the interpolation method described above cannot be used to obtain output responses of the CMYK combinations where the sum of CMY is located within the triangle bounded by points A, B, and P. Without knowing the printer output responses at point P, there is no way to obtain the printer output responses within this triangle via interpolation.

In order for the method of interpolation along the K direction to work, we need to add sample points at point P, where the K value is $K_p$ ($K_p = L_4 - 300$). With printer output responses on sample points P and B known, we can use simplicial interpolation based on these sample points to obtain the output responses for CMYK combinations on the 4-D colorant limited hyperplane from point P to point B. Then the method discussed for FIG. 2B can be applied to obtain printer output responses for CMYK combinations where the K value is within $K_i$ and $K_{i+1}$ and the sum of CMY is greater than $L_3(K_{i+1})$. As shown in FIG. 2A, the 3-D CMY limit at point P is 300 and there is only one point (C=M=Y=100) that satisfies this condition. So the only additional sample point we need to add is [100,100,100, $L_4$-300].

As shown in FIG. 2C, if the total 4-D colorant limit is less than 100, the maximum allowable K is also less than 100. For a standard target without colorant limitation, the K sampling always goes from 0 to 100. In this case, we need to rescale the K sampling points by the total colorant limit. There is only one point (i.e., no need for CMY sampling) for the maximum K value, which is [0,0,0, $L_4$].

Sampling and Modeling Colorant Limited CMY Space

For each K value in a standard CMYK target, the CMY samples are first applied to the nominal CMY colorant space without colorant limitation. These samples are then mapped onto the actual colorant limited CMY colorant space using the techniques disclosed in the previously-filed, co-pending patent applications that are incorporated by reference, techniques disclosed herein or other techniques. A standard way to tessellate the nominal CMY cube is to first partition the CMY cube into small rectangular parallelepipeds based on the rectilinear portions of the samples. Each small rectangular parallelepiped can then be partitioned into six tetrahedra according to which dimensions increase first, second, and last. For example, for a small rectangular parallelepiped, one tetrahedron can be defined by tracing the edges from the origin along C dimension first, then M dimension, and finally Y dimension. If there are extra samples that are not part of the rectilinear sampling, they can be used to refine the tetrahedra that contain them by further partitioning a containing tetrahedron into smaller tetrahedra.

In the nominal CMY colorant space with the standard tessellation discussed above, for each input CMY combination in the nominal space, the method for finding its containing tetrahedron to carry out the tetrahedral interpolation is very efficient. This will lead to an efficient way of modeling the nominal CMY cube by tetrahedral interpolation. However, this is no longer true after the tessellation of the nominal CMY cube is deformed onto the colorant limited actual CMY polytope. One way to take advantage of efficient tetrahedral interpolation on the nominal CMY cube for the colorant limited actual CMY polytope is to first map the actual CMY combination back to the nominal CMY combination. Then the tetrahedron containing the mapped nominal CMY combination can be efficiently found. For better accuracy, the nominal tetrahedron should be mapped back to the actual colorant limited CMY space to carry out the interpolation using the actual CMY combination. With this method, the efficiency of the tetrahedral interpolation for modeling the colorant limited actual CMY colorant space is essentially the same as that of the nominal space without colorant limitation. Unfortunately, there are two problems that prevent this method from working properly. The first problem is that the colorant limited CMY space tessellation mapped from the nominal CMY space tessellation doesn't completely cover the colorant limited polytope (see FIG. 1). The second problem is that a mapped tetrahedron in the actual CMY space obtained by its corresponding nominal CMY combination might not contain the actual CMY combination (see FIG. 1). Embodiments of the present invention disclose techniques to resolve these two problems so that the efficient interpolation method can be carried out on the colorant limited CMY space.

To address the second problem, if the actual CMY combination is not contained in the mapped tetrahedron in the colorant limited CMY space, it will be contained in one of the surrounding tetrahedra or in one of the extra tetrahedra constructed by the extra sample points discussed below.

To address the first problem, we need to add extra sample points so that the tessellation of the colorant limited CMY space completely covers the CMY polytope. In addition to finding these extra sample points, our technique constructs the extra tetrahedra in the colorant limited CMY space using these extra sample points. Our technique also associates each of the extra tetrahedron with one of the tetrahedra mapped from the tessellation of the nominal CMY cube. With such an arrangement, if the actual CMY combination is not contained in the mapped tetrahedron, the search for its containing tetrahedron is very limited and the efficiency of the technique is still essentially the same.

Figure 3:
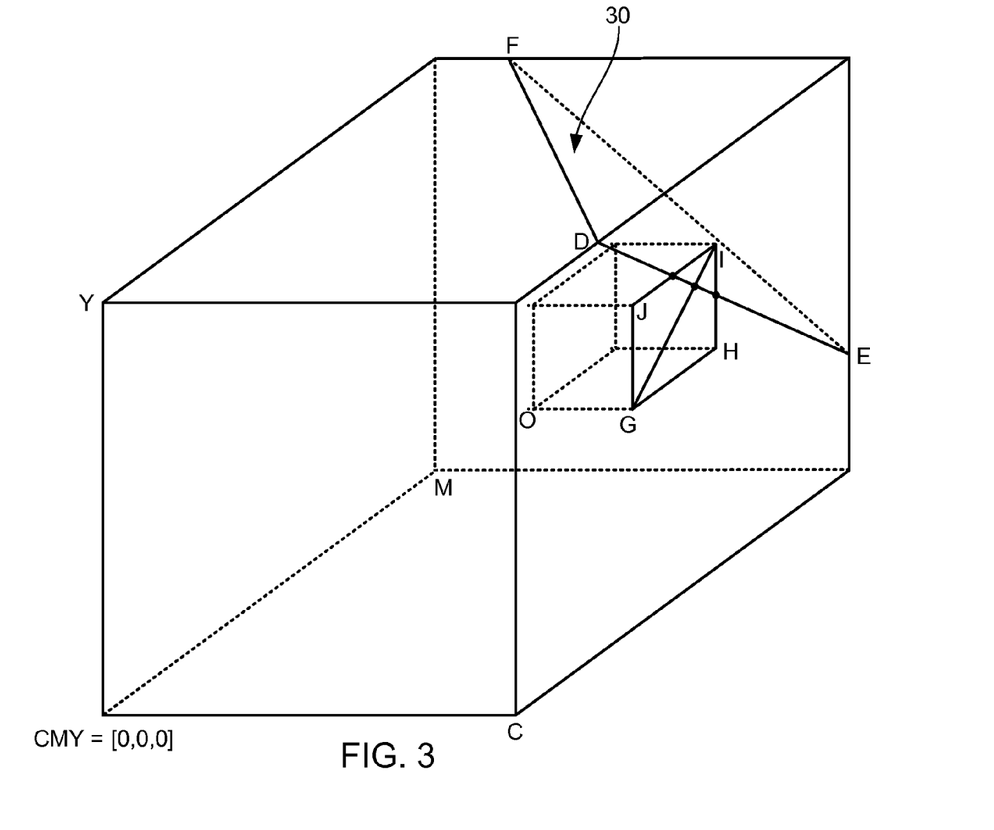
FIG. 3 is a diagram showing a location of additional sampling points along a colorant-limitation plane.

An exemplary method for obtaining the extra sample points is depicted in FIG. 3, which shows a nominal CMY cube and the colorant limit plane 30 (bounded by points D, E, and F). This nominal CMY cube will be tessellated by the standard technique discussed above. The extra sample points we need to add always occur on the intersection lines (DE, EF, and FD) between the colorant limit plane and the CMY cube. Furthermore, as shown in FIG. 3, they are the intersection points between the edges of the tetrahedra (obtained by the standard tessellation) and the intersection lines between the colorant limit plane and the CMY cube. In FIG. 3, GIJ and GIH are the faces of two of the tetrahedra. The fourth vertex of each of these tetrahedra is the local origin of the small cube with face GHIJ. This local origin is denoted as point O and the two tetrahedra are OGIJ and OGIH, respectively. From these two faces, three extra sample points are obtained. The extra tetrahedra in the colorant limited CMY space results from the mapping of the nominal sample point I (on the nominal CMY cube surface) onto the colorant limit plane on the colorant limited space. It can be shown that for tetrahedron OGIJ, two extra tetrahedra are obtained. These two extra tetrahedra are associated with the tetrahedron in the colorant limited space mapped from tetrahedron OGIJ. For a nominal CMY combination contained in tetrahedron OGIJ, if its mapped point in the colorant limited space is not contained in the tetrahedron mapped from OGIJ, then it will be contained in one of the two extra tetrahedra associated with the mapped OGIJ. This is also true for tetrahedron OGIH and others whose edges intersect with the intersection lines between the colorant limit plane and the CMY cube.

For full-colorant hyper cubes without colorant limitation, samplings with mostly rectilinear samples such as the IT8.7/3 and IT8.7/4 may be used in some embodiments. However, other reasonable non-rectilinear sampling methods can also be used as long as the sampling covers all the vertices of the hyper cube. Embodiments that do not use rectilinear sampling may employ methods for finding the simplex that contains the input color point that are not as efficient, but simplicial interpolation can still be carried out on a tessellation of the sampled points with some kind of simplex search strategy (the slowest one is to test all the simplexes one by one until the one containing the input color point is found).

For ink limited colorant space, i.e., the irregular polytope, there is no easy way to do rectilinear sampling to cover the whole polytope due to its irregular shape. However, other reasonable non-rectilinear sampling methods can be used as long as the sampling covers all the vertices of the polytope. Similar to the full-colorant hyper cube case, there will be no efficient way to search the simplexes produced by a tessellation of the sample points, but simplicial interpolation can still be carried out by using some kind of simplex search strategy. The advantage of our method is to transform an existing sampling and tessellation scheme of the full-colorant hype cube into the ink limited polytope and essentially preserve the efficient simplex search method if the sampling of the full-colorant cube being transformed is rectilinear.

Some embodiments of the present invention comprise methods for creating a device target with sample color patches to characterize the color response (ink, e.g., CMYK, to color, e.g., Lab, response) of a color imaging device (e.g., a color printer) using more than one colorant with a total colorant or ink limit constraint. Some of these methods may be described with reference to FIG. 4 and comprise the following steps:

Process I

Figure 4:
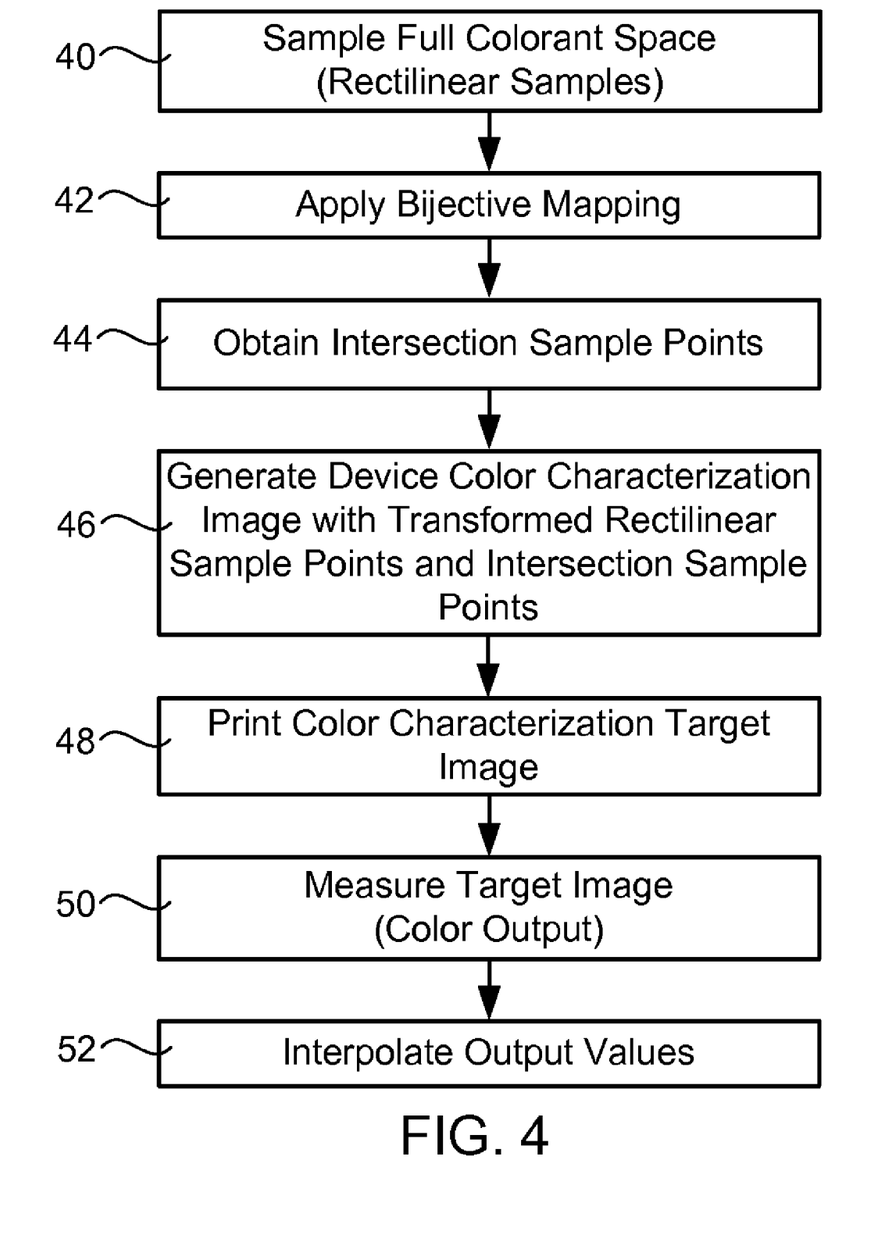
FIG. 4 is a chart showing an exemplary process comprising bijective mapping and generation of intersection sample points.

1. Use a rectilinear scheme to sample 40 the full colorant space without colorant limitation constraint. Some of these schemes are specified in international standards such as IT8.7/3-1993 and IT8.7/4-2005, as cited above and incorporated by reference.

2. Apply 42 a bijective mapping process, such as those disclosed in U.S. patent application Ser. No. 11/692,566, filed on Mar. 28, 2007 and U.S. patent application Ser. No. 10/892,845, filed Jul. 16, 2004, to transform the sample points into the colorant-limited space given the total colorant or ink limit.

3. Obtain 44 additional intersection sample points to cover the corners resulting from the intersection between the colorant limitation hyper-plane (a line in 2-D and a plane in 3-D) and the colorant hyper-cube without colorant limitation, as shown in FIG. 3. Exemplary methods for obtaining these additional intersection sample points may comprise the following steps:

a) Tessellate the sample points (obtained in Step 1 without the colorant limitation transform of Step 2) obtained from rectilinear sampling of the unconstrained colorant hyper-cube into simplexes (triangles in 2-D and tetrahedrons in 3-D).

b) Obtain the intersection points between the edges of the simplexes and the intersection lines between the colorant limitation hyper-plane and the unconstrained full colorant cube (FIG. 3). These intersection points are the additional points we want to obtain.

4. Layout the sample points obtained from the transformed rectilinear sampling of Step 2 and the additional intersection sample points obtained in Step 3 to form 46 a device color characterization target image or file with sample color patches.

5. Print 48 (in the case of printer) and measure 50 the target with a color measurement device to obtain the color output (e.g., in CIELAB) on each sample point.

6. Based on the device values of the sample points (both the transformed rectilinear ones obtained by Step 2 and the additional intersection ones by Step 3) and the measured color outputs in Step 5, use an interpolation method to obtain the color response (e.g., in CIELAB) for any input device value (e.g., CMYK) in the colorant limited colorant space.

Figure 5:
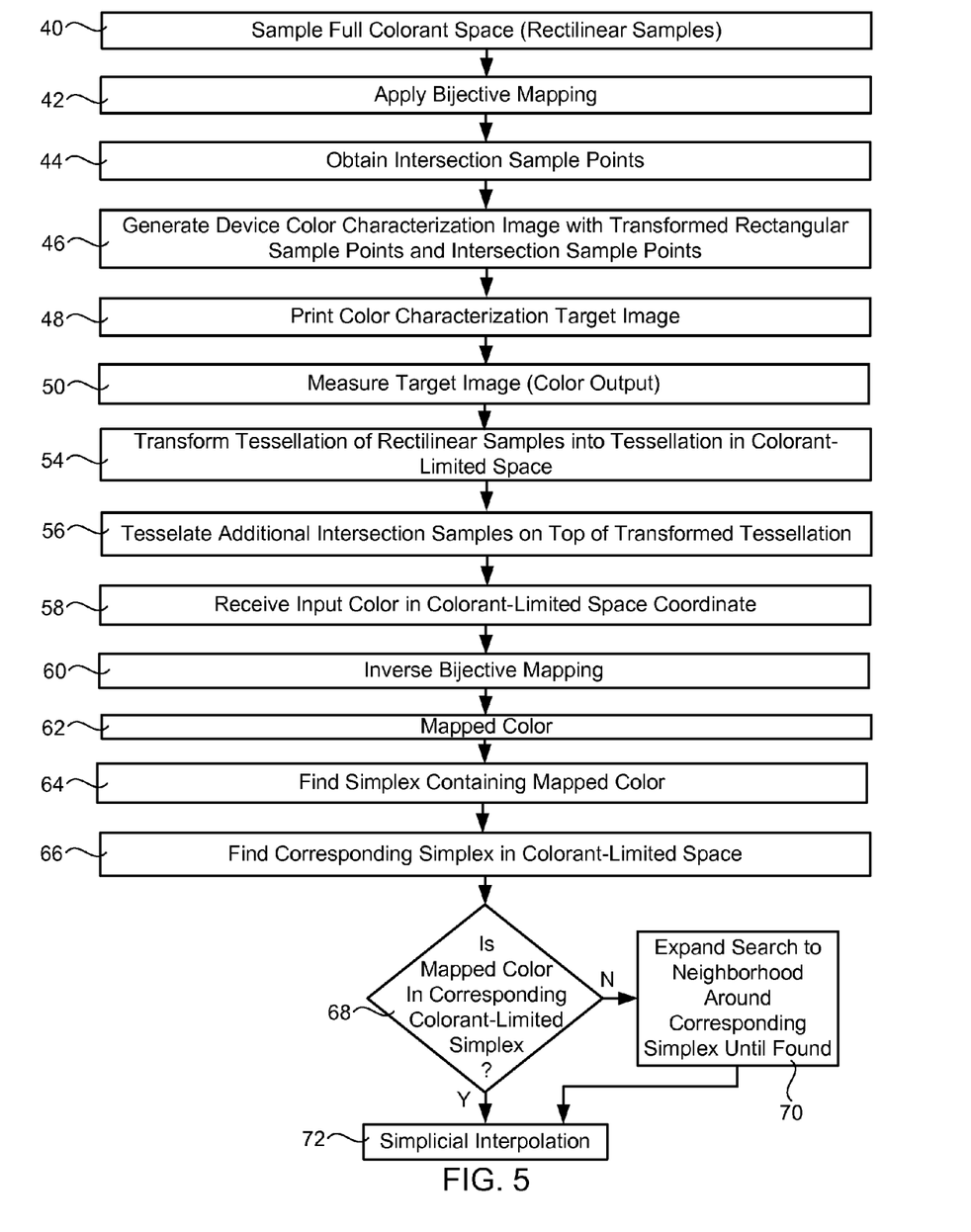
FIG. 5 is a chart showing an exemplary process comprising an expanded search in neighboring simplexes.

Some embodiments of the present invention, illustrated in FIG. 5, may comprise methods similar to those described above for Process I, wherein the interpolation methods in Step 6 comprise the following steps:

Process IA a) Transform 54 (by the same method used in Step 2 of Process I) tessellation of rectilinear samples on unconstrained full colorant color space (illustrated in FIG. 1A by a 2-D example) into tessellation in the colorant limited color space (FIG. 1B minus the shaded areas AC'D' and BE'F'). Tessellate 56 the additional intersection sample points on top of the transformed tessellation obtained from 54 to form a complete tessellation of the transformed rectilinear and additional intersection sample points. (The result of this step is the whole of FIG. 1B.)

b) For an input color 58 in the colorant-limited colorant space, apply 60 the inverse bijective mapping (inverse of the mapping used in Step 2 of Process I) to the input color to obtain its mapped color 62 in the full colorant space without colorant limitation.

c) Find 64 the simplex that contains the mapped color in the full colorant space without colorant limitation.

d) Find 66 the corresponding simplex in the colorant-limited colorant space that is transformed from the simplex in the full colorant space by Step 2 of Process I.

e) Check 68 whether the input color (in colorant limited space) is contained in the transformed simplex in the colorant-limited space. If the color is not contained in the simplex, expand 70 the search of simplexes to include the simplexes in a neighborhood surrounding this original simplex, preferably from the one closest to the original simplex to the ones further away from it, until the simplex containing the input color is found.

f) Using a standard simplicial interpolation 72 technique to calculate the output color value (e.g., in CIELAB) based on the measured color values on the vertices of the simplex obtained by the last step.

Some embodiments of the present invention may comprise methods wherein the imaging device uses three colorants, such as a CMY printer or a RGB display. In this case, a simplex is a tetrahedron.

Some embodiments of the present invention may comprise methods similar to those described above for Processes I and IA, wherein the imaging device uses four colorants or colorants, such as a CMYK printer.

Some embodiments of the present invention may comprise methods similar to those described above for Processes I and IA, wherein a four colorant imaging device is used and wherein the interpolation of one of the colorants (e.g., K) is performed differently from the rest of the colorants. This process will be referred to as Process II. The interpolation along the differently-interpolated, e.g. K, direction may comprise a standard 1-D linear interpolation and the interpolation in the CMY domain may comprise a tetrahedral interpolation method.

Figure 6:
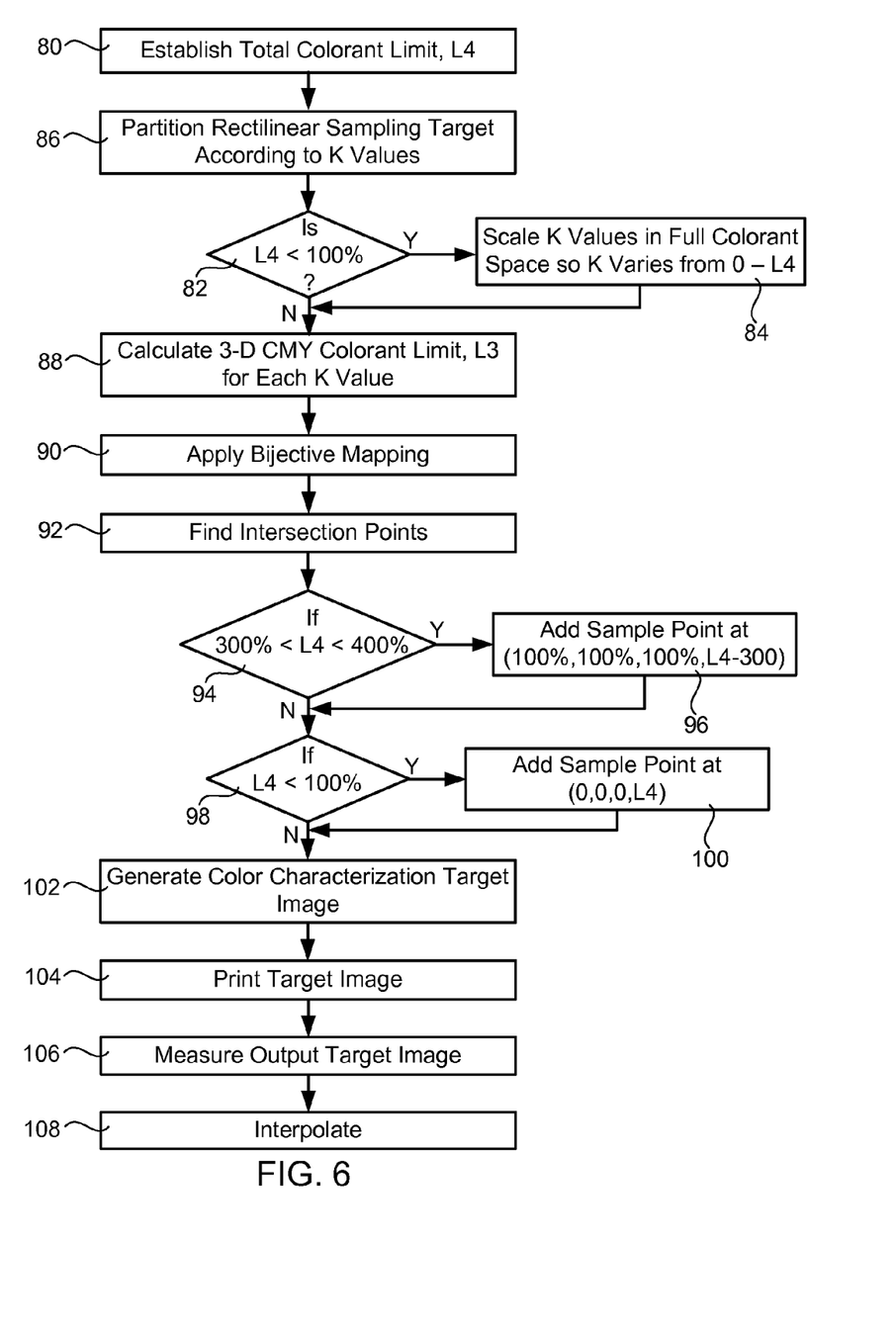
FIG. 6 is a chart showing an exemplary process comprising partitioning of a rectilinear sampling target according to K values.

An exemplary method, illustrated in FIG. 6, may comprise the following steps:

Process II

1. Establishing 80 a total colorant limit, $L_4$.

2. Partition 86 the rectilinear sampling target in the full colorant space without colorant limitation (Step 1 of Process I) according to K values. The result of this partition is multiple sets of CMY samples with fixed Ks. And, if 82 the total colorant limit ($L_4$) is less than 100% (the maximum amount of a single colorant), scale 84 the K values in the set of fixed K values resulting from the partition so that the K sampling goes from 0 to $L_4$ (instead of 100%). FIG. 2C illustrates aspects of this step.

3. For each K value in the above partition, calculate 88 the 3-D CMY colorant limit by $L_3=L_4-K$, where $L_4$ is the total 4-D CMYK colorant limit and $L_3$ is the CMY limit given K.

4. For each of the partitioned CMY samples with a fixed K, apply bijective mapping 90 and find 92 intersection points (Steps 2 and 3 in Process I for the 3-D CMY values only) to obtain a set of CMYK sample points with K fixed and CMY varying (the sample points obtained from both Step 2 and Step 3 in Process I for CMY colorants) using the 3-D CMY colorant limit ($L_3$ in Step 2).

5. If the total colorant limit ($L_4$) is 94 between 300% and 400%, add 96 an additional CMYK sample point (100%, 100%, 100%, $L_4-300$%) (FIG. 2A). If the total colorant limit ($L_4$) is 98 less than 100%, add 100 an additional CMYK sample point $(0, 0, 0, L_4)$, in percentages. This aspect is shown in FIG. 2C.

6. Layout 102 the CMYK sample points obtained from Steps 4 and 5 to form a CMYK color characterization target image or file with sample color patches.

7. Print 104 (in the case of printer) and measure 106 the target with a color measurement device to obtain the color output (e.g., in CIELAB) on each sample point.

8. Based on the device values of the sample points obtained from Steps 4 and 5 and the measured color outputs from Step 7, use 108 an interpolation method to obtain the color response (e.g., in CIELAB) for any input device value (e.g., CMYK) in the colorant limited colorant space.

Figure 7:
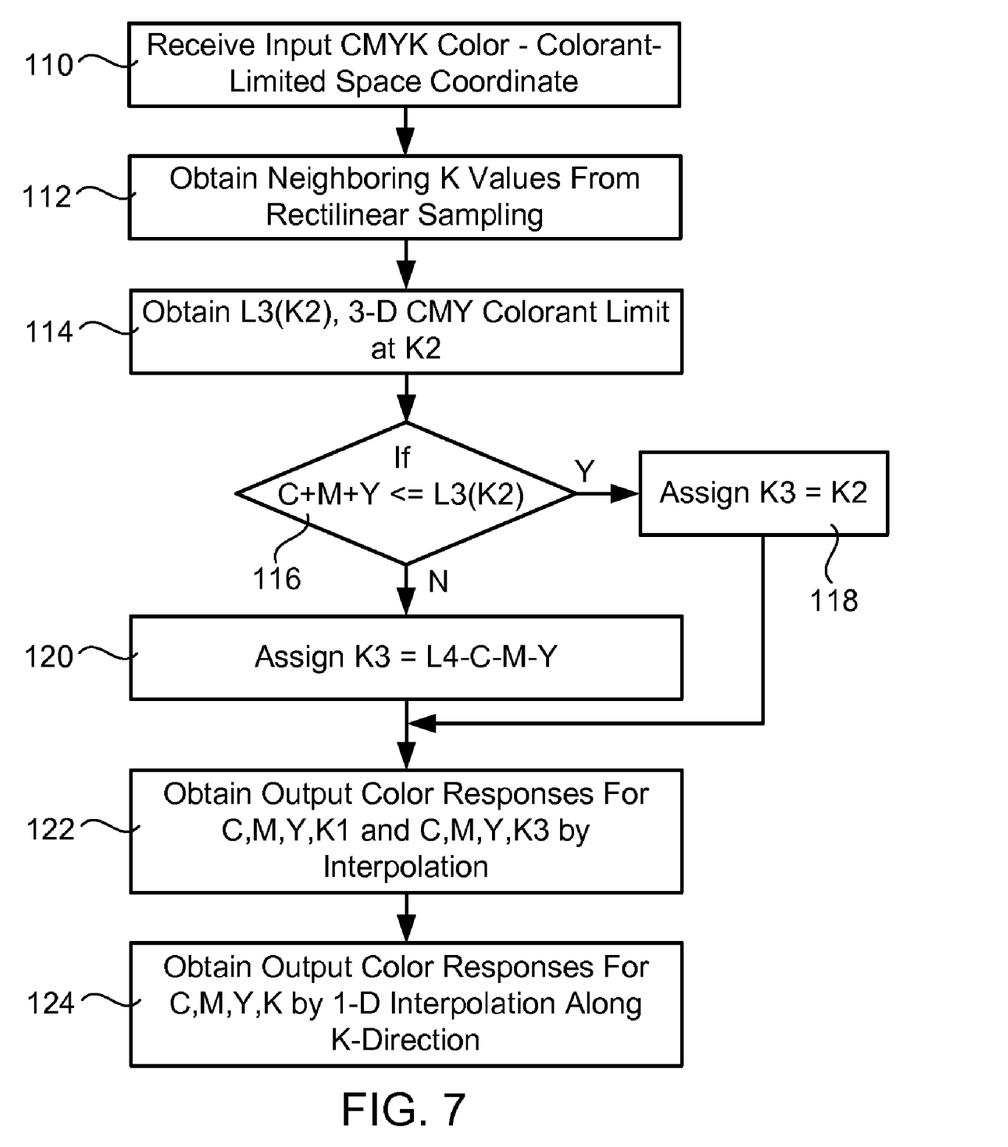
FIG. 7 is a chart showing an exemplary interpolation process comprising determination of intermediate color output values for CMY colorant for two different K values and then interpolate for a color output value for the input CMYK by 1-D interpolation along the K direction.

Some embodiments of the present invention, illustrated in FIG. 7, may comprise methods similar to those described above as Process II, wherein the interpolation method (in Step 8) comprises the following steps:

Process III a) For an input CMYK 110 in the colorant-limited device colorant space, obtain 112 the two neighboring values, K1 and K2, from the set of K values obtained in Step 2 of Process II such that K1<=K<=K2.

b) Obtain 114 the 3-D CMY colorant limit at K2 (the larger of the K values) by $L_3$ (K2)=$L_4$–K2.

c) If 116 the sum of the input CMY values is less than or equal to $L_3$ (K2), assign 118 K3=K2; otherwise 120 assign K3=$L_4$–C–M–Y. (This is illustrated in FIG. 2B where point E corresponds to K3 shown as K' in the figure.)

d) Obtain 122 output color responses (e.g., in CIELAB) for input colors (C, M, Y, K1) and (C, M, Y, K3), respectively, using a method of interpolation based on the measurement data obtained in Step 7 of Process II.

e) Obtain 124 the output color response (e.g., in CIELAB) for input color CMYK using standard 1-D interpolation along the K direction between K1 and K3 based on the results from the last step.

Figure 8:
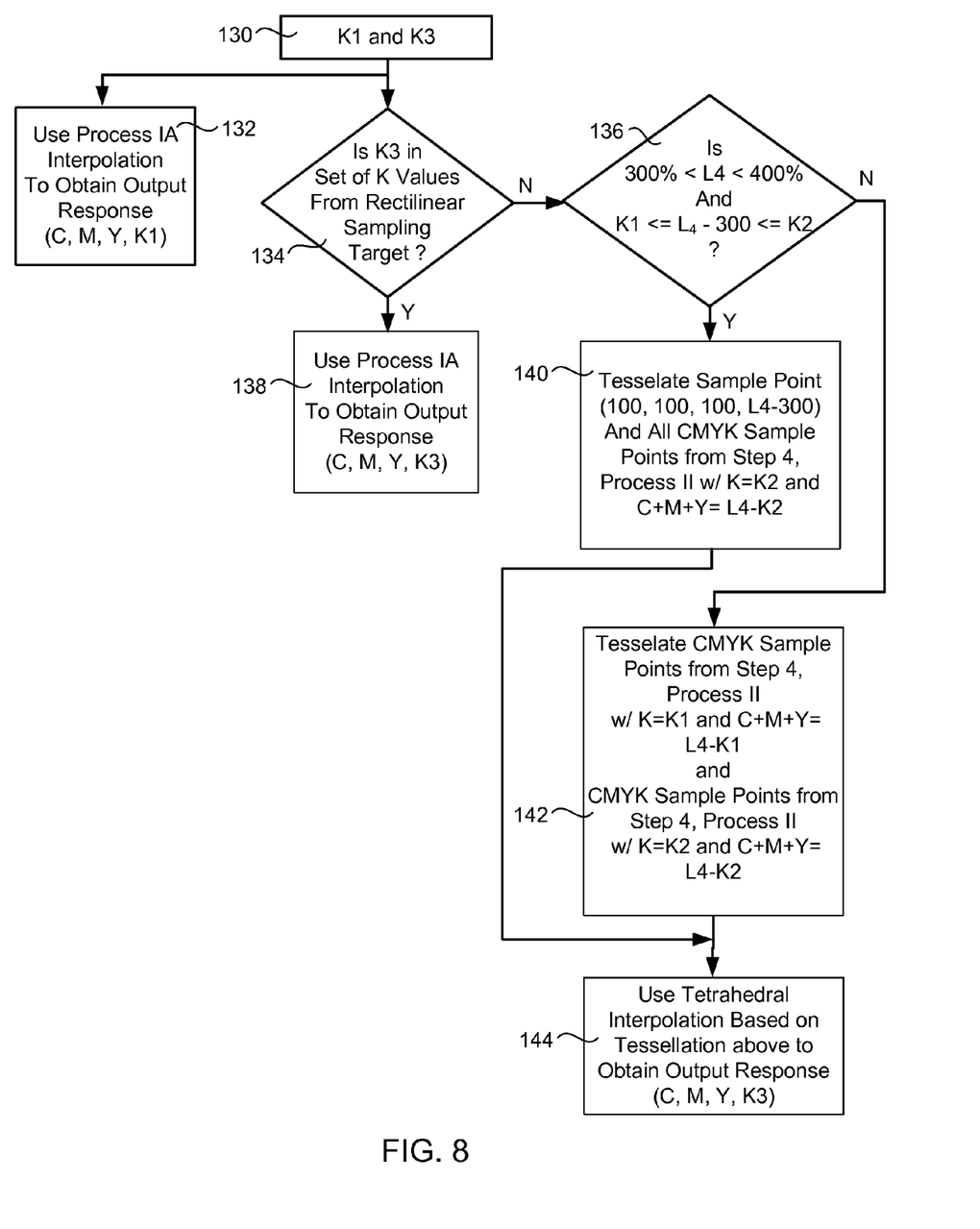
FIG. 8 is a chart showing an exemplary interpolation process for obtaining the intermediate color output values for CMY colorant for two different K values comprising calculation of output responses with alternative tessellation based on a colorant limit.

Some embodiments of the present invention, illustrated in FIG. 8, may comprise methods similar to those described above as Process III, wherein the interpolation method described in Step d) of Process III comprises the following steps:

Process IV a) Determine 134 whether the K value (either K1 or K3 in Step d) of Process III) is one of the K values in the set of K values resulting from the partitioning of the rectilinear sampling target in Step 2 of Process II. K1 will always be in the set so Process IA is applied 132. K3 will also be in the set if K3=K2 as tested in Step c) of Process III; otherwise K3 is not in the set.

b) If 134 K3 is in the set of K values resulting from the partitioning in Step 2 of Process II, the interpolation method 138 in Process IA is used to obtain the output response of (C, M, Y, K3). Otherwise (this only happens with K3 when it is not the same as K2), the following steps are used to obtain the output response:

i) If 136 the total colorant limit ($L_4$) is between 300% and 400% and K1<=$L_4$–300<=K2 (FIG. 2A), tessellate 140 the additional sample point (100%, 100%, 100%, $L_4$–300%) obtained in Step 5 of Process II and all the CMYK sample points obtained in Step 4 of Process II with K=K2 and C+M+Y=$L_4$–K2 (the sample points on the CMY colorant limitation plane for K=K2). Otherwise (FIG. 2B), Tessellate 142 the CMYK sample points obtained in Step 4 of Process II with K=K1 and C+M+Y=$L_4$–K1 (the sample points on the CMY colorant limitation plane for K=K1) and those sample points with K=K2 and C+M+Y=$L_4$–K2 (the sample points on the CMY colorant limitation plane for K=K2).

ii) Use the standard simplicial interpolation 144 technique based on the tessellation constructed above to obtain the color output response at (C, M, Y, K3).

Alternative Embodiments

Instead of decomposing the CMYK target into a collection of CMY targets and using tetrahedral interpolation in the CMY space, the technique of some embodiments can be directly applied to the CMYK target and 4-D simplicial interpolation can be used.

In 4-D simplicial interpolation, the nominal CMYK hypercube is first partitioned into small 4-D rectangular parallelepipeds and a small 4-D rectangular parallelepiped can be partitioned into 24 4-D simplexes according to which dimensions increase first, second, third, and last. For example, for a small 4-D rectangular parallelepiped, one 4-D simplex can be defined by tracing the edges from the origin along C dimension first, M dimension second, Y dimension third, and finally K dimension. The method of finding the extra sample points is to find the intersection points between the edges of the 4-D simplexes and the intersection lines between the colorant limitation hyperplane and the nominal 4-D CMYK hypercube.

The terms and expressions which have been employed in the foregoing specification are used therein as terms of description and not of limitation, and there is no intention in the use of such terms and expressions of excluding equivalence of the features shown and described or portions thereof.

What is claimed is:

1. A method for modeling a colorant-limited, multi-dimensional colorant space, said method comprising:
   a) representing a full-colorant space as a multi-dimensional full-colorant hyper cube without colorant limitations;
   b) sampling said full-colorant color space using a rectilinear sampling scheme, thereby producing rectilinear sample points;
   c) representing a colorant-limited colorant space with a multi-dimensional hyper cube limited by a colorant-limitation hyperplane;
   d) transforming said rectilinear sample points, using a bijective mapping process, to said colorant-limited colorant space, thereby producing transformed rectilinear sample points;
   e) tessellating said rectilinear sample points into full-colorant-color space simplexes;
   f) obtaining intersection sample points located at the intersection of the edges of said full-colorant-color-space simplexes and the intersection lines between the colorant limitation hyper-plane and said full colorant hypercube; and
   g) using said transformed rectilinear sample points and said intersection sample points to model a device color gamut of the colorant-limited colorant space, by generating color patches on an output device and measuring said color patches with a measuring device.

2. A method as described in claim 1 wherein said using said transformed rectilinear sample points and said intersection sample points to model a colorant-limited device color gamut comprises printing color patches of said sample points to create a device characterization target image.

3. A method as described in claim 2 further comprising measuring said color patches with a color measuring device to determine color output values for said color patches.

4. A method as described in claim 3 further comprising correlating said color output values with the coordinates of their corresponding transformed rectilinear sample points and intersection sample points.

5. A method as described in claim 4 further comprising:
   a) receiving an input color defined by an input color coordinate in said colorant-limited colorant space;
   b) determining a color output value corresponding to said input color coordinate by interpolating between said transformed rectilinear sample points and intersection sample points.

6. A method as described in claim 1 wherein said bijective mapping process comprises identifying a point in said multi-dimensional hypercube limited by a colorant-limitation hyperplane, wherein said point defines a region into which points outside said colorant-limitation hyperplane are mapped.

7. A method as described in claim 1 further comprising:
a) transforming said full-colorant-space simplexes into transformed simplexes for said transformed rectilinear sample points;
b) tessellating said intersection sample points on top of said transformed simplexes to form intersection point simplexes for a complete tessellation of said transformed rectilinear and intersection sample points;
c) receiving an input color defined by an input color coordinate in said colorant-limited colorant space;
d) inverse transforming said colorant-limited input color coordinate using an inverse bijective mapping process that is the inverse of said bijective mapping process to obtain full-colorant-space input coordinate;
e) determining an input color simplex from among said full-colorant-space simplexes, wherein said input color simplex contains said full-colorant-space input coordinate;
f) finding a transformed input color simplex from among said transformed simplexes, wherein said transformed input color simplex corresponds to said input color simplex;
g) determining whether said colorant-limited input color coordinate is contained in said transformed input color simplex;
h) if said colorant-limited input color coordinate is not found in said transformed input color simplex, searching a neighborhood of simplexes among said complete tessellation of said transformed rectilinear and intersection sample points in the vicinity of said transformed input color simplex to locate a simplex containing said colorant-limited input color coordinate; and
i) interpolating a color output value by using simplicial interpolation between the vertices of said simplex containing said colorant-limited input color coordinate.

8. A method for modeling a colorant-limited, 4-colorant space using multiple interpolation methods, said method comprising:
a) establishing a total colorant limit, $L_4$;
b) representing a full colorant space as a 4-dimensional hypercube without colorant limitations;
c) partitioning a 4-D rectilinear sampling target in said full colorant space according to a fourth dimension, such that said partitioning results in multiple sets of first, second and third dimension rectilinear samples within 3-D full colorant cubes, wherein each of said 3-D full colorant cubes has a fixed fourth dimension value, D4, and wherein said fixed fourth dimension values are scaled to extend between 0 and $L_4$ if said total colorant limit, $L_4$, is less than 100% of the maximum amount of a single colorant;
d) producing a plurality of 3-D rectilinear sampling targets with fixed fourth dimension values, D4;
e) calculating 3-D colorant limits, $L_3$, for each of said fourth dimension values, D4, in said 3-D rectilinear sampling targets, wherein $L_3=L_4-D4$;
f) for each of said fourth dimension values, D4, representing a 3-D colorant-limited colorant space with one of said 3-D full colorant cubes limited by a colorant-limitation plane, which is at least partially defined by a corresponding one of said 3-D colorant limits, $L_3$;
g) for each fourth dimension value, D4, transforming said 3-D full colorant cube samples, using a bijective mapping process, to said colorant-limited colorant space, thereby producing transformed 3-D colorant-limited cube sample points;
h) for each fourth dimension value, D4, tessellating said 3-D full colorant cube samples into full-colorant-space simplexes having full-colorant space simplex lines between simplex vertices;
i) for each fourth dimension value, D4, obtaining intersection sample points located at the intersections of said full-colorant space simplex lines, on the surfaces of said full colorant space cube, and said 3-D colorant-limitation plane; and
j) for each fourth dimension value, D4, using said colorant-limited cube sample points and said intersection sample points to model a device color gamut, in a 3-D colorant-limited colorant space, of a virtual 3-colorant device with said fixed fourth dimension value, D4, by generating color patches on an output device and measuring said color patches with a measuring device.

9. A method as described in claim 8 further comprising adding a first designated sample point at the value (100%, 100%, 100%, $L_4$–300%) when said total colorant limit, $L_4$, is between 300% and 400% of a maximum value for a single colorant.

10. A method as described in claim 8 further comprising adding a second designated sample point at the value (0, 0, 0, $L_4$) when said total colorant limit, $L_4$, is less than 100% of a maximum value for a single colorant.

11. A method as described in claim 8 wherein said using said 3-D colorant-limited cube sample points and said intersection sample points to model a device color gamut further comprises, for all the fourth-dimension values, modeling a 4-D colorant-limited device color gamut, wherein said modeling comprises printing 4-colorant color patches of said 3-D colorant-limited cube sample points and said intersection points for a plurality of said fixed fourth dimension values to create a device characterization target image.

12. A method as described in claim 11 further comprising measuring said color patches with a color measuring device to determine color output values for said color patches.

13. A method as described in claim 12 further comprising correlating said color output values with the coordinates of their corresponding 3-D colorant-limited cube sample points and said intersection sample points with fixed fourth dimension values, D4, for all the fourth dimension values.

14. A method as described in claim 13 further comprising using the result of said correlating to interpolate a color output value for an input color value in said colorant-limited colorant space.

15. A method as described in claim 14 further comprising:
a) receiving an input color defined by an input color coordinate in said colorant-limited colorant space, wherein said input color coordinate is represented by (C, M, Y, K), wherein K is a value in said fourth dimension;
b) obtaining neighboring values, K1 and K2, on either side of K, wherein said neighboring values were established in said partitioning and K1<=K<=K2;
c) obtaining a 3-D CMY colorant limit for K2 using the expression: $L_3(K2)=L_4-K2$;
d) if $C+M+Y<=L_3(K2)$, assign K3=K2;
e) if $C+M+Y>L_3(K2)$, assign K3=$L_4$–C–M–Y;
f) determining color output values for neighboring colors described by the coordinates (C,M,Y,K1) and (C,M,Y, K3) using interpolation based on values determined during said measuring said color patches; and
g) determining a color output value for said input color, (C,M,Y,K), by interpolating in the K dimension between K1 and K3 based on said color output values for neighboring colors.

16. A method as described in claim 15 wherein said determining color output values for said neighboring colors by interpolation, wherein said neighboring colors are identified by the coordinates (C,M,Y,Kn) where n is either 1 or 3, further comprises:
 a) determining whether Kn is a value determined in said partitioning said 4-D rectilinear sampling target;
 b) if Kn is a value determined in said partitioning a rectilinear sampling target,
  i) transforming said full colorant cube simplexes from said tessellation of said 3-D full colorant cube for fixed Kn into transformed simplexes for said transformed 3-D colorant-limited cube sample points;
  ii) tessellating said intersection sample points on top of said transformed simplexes to form intersection point simplexes for a complete tessellation of said transformed rectilinear and intersection sample points;
  iii) inverse transforming (C,M,Y) in said (C,M,Y,Kn) using an inverse bijective mapping process that is the inverse of said bijective mapping process to obtain a full-colorant-space input coordinate for transformed (C,M,Y) in said 3-D full colorant cube;
  iv) determining an input color simplex from among said CMY full-colorant-space simplexes, wherein said input color simplex contains said transformed (C,M,Y);
  v) finding a transformed input color simplex from among said transformed simplexes, wherein said transformed input color simplex corresponds to said input color simplex;
  vi) determining whether said (C,M,Y) is contained in said transformed input color simplex;
  vii) if said (C,M,Y) is not found in said transformed input color simplex, searching a neighborhood of simplexes among said complete tessellation of said transformed rectilinear and intersection sample points in the vicinity of said transformed input color simplex to locate a simplex containing said (C,M,Y); and
  viii) interpolating a color output value by using simplicial interpolation between the vertices of said simplex containing said (C,M,Y).
 c) if Kn is not a value determined in said partitioning said 4-D rectilinear sampling target,
  i) if $L_4$ is between 300% and 400% of a maximum value for a single colorant and $K1<=L_4-300\%<=K2$;
  ii) adding a first designated sample point at the value (100%, 100%, 100%, $L_4-300\%$) and
  iii) tessellating said colorant-limited cube sample points, which satisfy the constraint $C+M+Y=L_4-K2$, obtained when $K=K2$ and said first designated sample point thereby creating first modified simplexes;
  iv) if L4 is not between 300% and 400% of a maximum value for a single colorant;
  v) tessellating said 3-D colorant-limited cube sample points, which satisfy the constraint $C+M+Y=L_4-K1$, obtained when $K=K1$ and said 3-D colorant-limited cube sample points, which satisfy the constraint $C+M+Y=L_4-K1$, obtained when $K=K2$ thereby creating second modified simplexes;
 d) using simplicial interpolation to interpolate a color output value for said (C,M,Y,Kn), using at least one of said first or said second modified simplexes.

* * * * *